(12) United States Patent
Hsu et al.

(10) Patent No.: US 7,677,743 B2
(45) Date of Patent: Mar. 16, 2010

(54) KEYPAD LIGHT GUIDE WITH LINED APERTURES

(75) Inventors: Tung-Ming Hsu, Taipei Hsien (TW); Chien-Min Chen, Taipei Hsien (TW); Ming-Fu Hsu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 394 days.

(21) Appl. No.: 11/617,620

(22) Filed: Dec. 28, 2006

(65) Prior Publication Data

US 2008/0089050 A1    Apr. 17, 2008

(30) Foreign Application Priority Data

Oct. 13, 2006    (CN)    ......................... 2006 1 0063090

(51) Int. Cl.
*G01D 11/28* (2006.01)

(52) U.S. Cl. ............................. 362/23; 362/618; 362/26

(58) Field of Classification Search .................. 362/24, 362/26, 618, 620, 622

See application file for complete search history.

(56) References Cited

U.S. PATENT DOCUMENTS

| 5,053,928 | A | 10/1991 | Pasco |
| 5,083,240 | A | 1/1992 | Pasco |
| 7,210,835 | B2 * | 5/2007 | Chang et al. ................. 362/558 |
| 7,304,697 | B2 * | 12/2007 | You .............................. 349/69 |
| 7,357,523 | B2 * | 4/2008 | Kao et al. ...................... 362/23 |
| 2008/0030860 | A1 * | 2/2008 | Chang ......................... 359/599 |

* cited by examiner

*Primary Examiner*—Ali Alavi
(74) *Attorney, Agent, or Firm*—Clifford O. Chi (57) ABSTRACT

An exemplary process for making a light guide includes the steps of: providing a transparent base sheet; punching the base sheet to form an array of first apertures therein; coating a melted resin material in the first apertures and making the melted resin material fill up the first apertures; solidifying the melted resin material to form a plurality of resin blocks; punching the base sheet to form an array of second apertures in the resin blocks, the second apertures configured for illuminating the keys via at least one light source; and trimming the base sheet with the second apertures to form a light guide. A light guide made by the process is also provided.

8 Claims, 7 Drawing Sheets

KEYPAD LIGHT GUIDE WITH LINED APERTURES

BACKGROUND OF THE INVENTION

1. Field of the Invention

The present invention relates to a light guide for illuminating keys of a keyboard and/or a keypad, and also relates to a process for making the light guide.

2. Discussion of the Related Art

Portable electronic devices usually include keyboards and/or keypads for inputting information. When portable electronic devices are used in the dark, the keys need to be illuminated. Light guides are used to transfer light rays from a light source to illuminate the keyboards and/or the keypads of the portable electronic devices. In a typical portable electronic device such as a mobile phone, the light guide is positioned between a printed circuit board and the display and/or keyboard. The light guide can for example be a light emitting diode (LED). The light guide conveys the light rays from the LED, to illuminate the display and/or keyboard.

Figure 7:
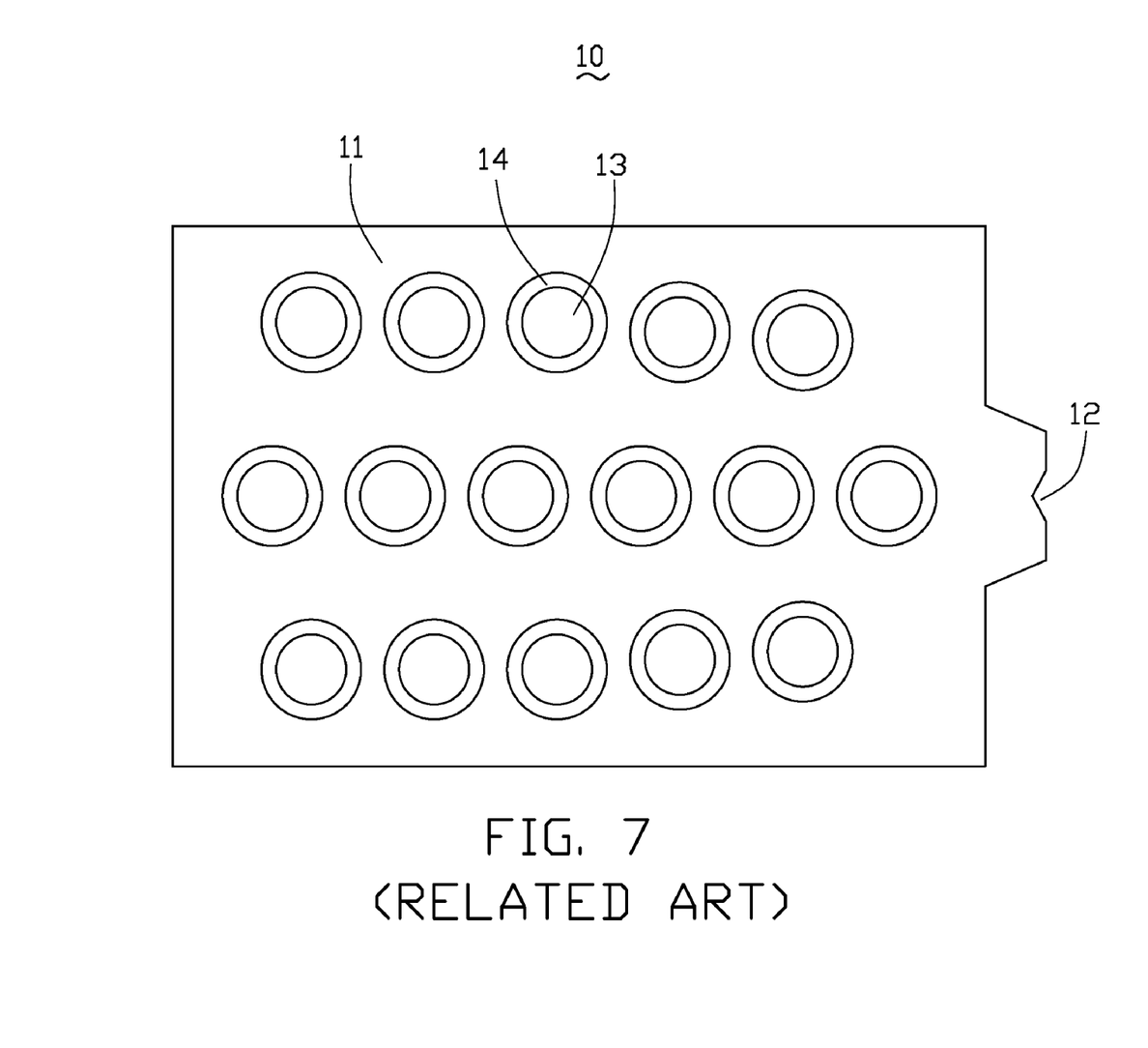
FIG. 7 is a top plan view of a conventional keypad light guide.

Referring to FIG. 6, a typical keypad light guide 10 for a mobile phone is shown. The light guide 10 includes a transparent base sheet 11, a light entrance 12 located at one side of the base sheet 11, and a regular array of apertures 13 defined on the base sheet 11. The apertures 13 correspond to shapes of keys (not shown). Each aperture 13 is surround by an upstanding collar 14 integrally formed with the base sheet 11. Light rays are introduced into the light guide 10 from a distributed light source (not shown) such as an LED disposed adjacent to the light entrance 12. The collars 14 have chamfered side faces. The side surfaces are roughened meaning that they are optical imperfect and causes light rays to escape. Thus, the light guide provides an illuminated ring around the key. However, the structure of the light guide 10 is complex.

Typically, the light guide 10 is manufactured by injection molding technology. With a requirement for a thin type light guide, an injection mold for making the thin light guide is required to have great pressing capability. This means the injection mold may be a complex apparatus. Such injection mold is expensive and may require much maintenance, thus increasing the cost of injection molding. In addition, in industry, in order to mass-produce the light guides, the injection molds usually have a plurality of cavities for making a plurality of light guides at a same process. However, in a same pressing process, the light guides may have differing pressures applied by the injection mold, such that the light guides have non-uniform thickness.

What is needed, therefore, is a new process for making a light guide which can overcome the above-described shortcomings. What is also needed is an efficacious light guide made according to such process.

SUMMARY

In one aspect, a process for making a light guide for illuminating keys of a keyboard or keypad of a portable electronic device, according to a preferred embodiment includes: providing a transparent base sheet; punching the transparent base sheet to form an array of apertures therein, the apertures configured for allowing the keys of a portable electronic device to be illuminated by at least one light source; and trimming the base sheet with the apertures to form a light guide.

In another aspect, a process for making a light guide for illuminating keys of a keyboard or keypad of a portable electronic device, according to a preferred embodiment includes: providing a transparent base sheet; punching the base sheet to form an array of first apertures therein; coating a melted resin material in the first apertures so that the melted resin material fills up the first apertures; solidifying the melted resin material to form a plurality of resin blocks; punching the base sheet to form an array of second apertures in the resin blocks, the second apertures configured for allowing the keys of a portable electronic device to be illuminated by at least one light source; and trimming the base sheet with the second apertures to form a light guide.

In still another aspect, a light guide according to a preferred embodiment includes a base sheet; an array of apertures defined in the base sheet; and a resin layer formed on an inner surface of each aperture. A light refractive ratio of the resin layer is larger than that of the base sheet. The resin layer includes a transparent matrix resin and a plurality of light diffusion particles dispersed in the transparent matrix resin.

Other advantages and novel features will become more apparent from the following detailed description of various embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present light guide and processes for making the same. Moreover, in the drawings, like reference numerals designate corresponding parts throughout the several views, and all the views and diagrams are schematic.

DETAILED DESCRIPTION OF THE PREFERRED EMBODIMENTS

Reference will now be made to the drawings to describe preferred embodiments of the present processes for making a light guide, in detail.

Figure 1:
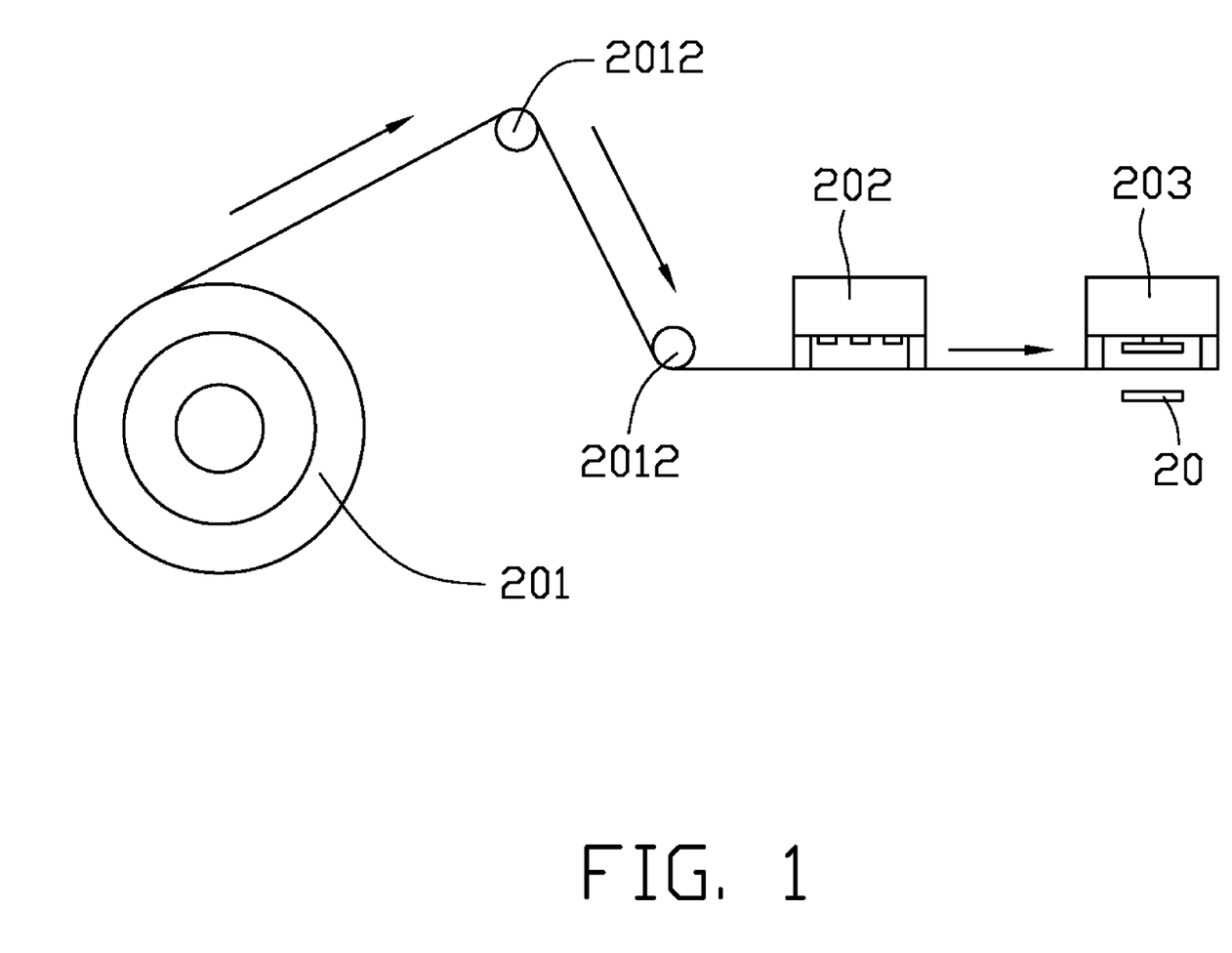
FIG. 1 is a diagram of a process for making a light guide according to a first preferred embodiment of the present invention.

FIG. 1 is a schematic chart of a process for making a light guide 20 according to a first preferred embodiment. The light guide 20 is typically used for illuminating keys of a keyboard and/or a keypad of a portable electronic device. The process mainly includes the following three steps:

Step one: a continuous transparent base sheet 201 is provided. A material of the base sheet 201 is preferably selected from a group consisting of polymethyl methacrylate (PMMA), polycarbonate (PC), and other suitable transparent resin materials. In this embodiment, the base sheet 201 is a coiled sheet. The base sheet 201 can be continuously fed to a punching machine 202 by a number of rolling devices 2012.

Figure 2:
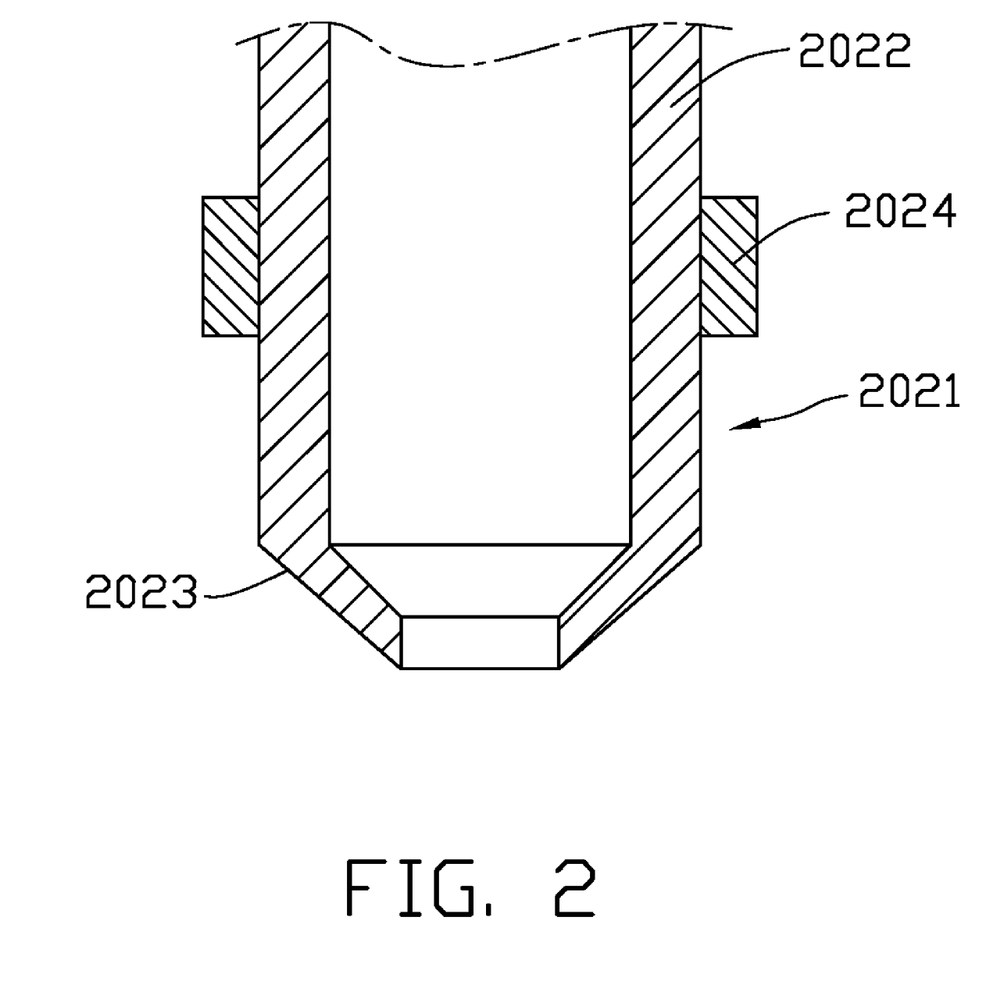
FIG. 2 is a side cross-sectional view of an end part of one of cutters of a punching apparatus shown in FIG. 1.

Step two: at the punching machine 202, the base sheet 201 undergoes a punching process thereby yielding a punched sheet. In the punching process, the base sheet 201 is punched by the punching machine 202 to form an array of apertures. The apertures are configured for enabling the keys to be illuminated by at least one light source. Numbers and shapes of the apertures can be controlled according to a predetermined design. The shape of each of the apertures is preferably either a round hole or a polygonal hole. In this embodiment, the shape of each of apertures is conical frustum hole, and an inner surface of each of the apertures is slanted to an extending direction of the base sheet 201. The slanted inner surface of each aperture of the base sheet 201 can be obtained by applying cutters 2021 in the punching machine 202. Referring to FIG. 2, one of the cutters 2021 of the punching machine 202 is shown. The cutter 2021 includes a cylindrical body portion 2022, a blade 2023, and a heater 2024. The blade 2023 is located at an end of the body portion 2022, and slanted to the body portion 2022. The heater 2024 is in contact with the body portion 2022 near the blade 2023. The cutter 2021 can be heated by the heater 2024. The heater 2024 can adjust a working temperature of the cutter 2021 to be a suitable working temperature according to a thickness and the material of the base sheet 201.

Step three: the base sheet 201 with the apertures then undergoes a trimming process. In this die cut process, the base sheet 201 with the apertures is trimmed into light guides 20 by a die cut machine 203 according to the predetermined design. In an exemplary embodiment, the base sheet 201 can also be cut into light guides 20 by scissors. In this embodiment, the light guides 20 are continuously punched out of the base sheet 201 during a punching step applied by the die cut machine 203. It should be pointed out that in one embodiment of this procedure, after the trimming process, the light guides 20 may be partly connected to corresponding parts of the base sheet 201. In such embodiment, the base sheet 201 with the light guides 20 can be coiled to form a roll that can be conveniently provided at a portable electronic device assembly line.

Complex and expensive apparatuses, such as injection molds, are not needed to produce the light guides by the present process. It is very convenient and cost-efficient to mass-produce the light guides employing the present process, because the punching machine 202 and die cut machine 203 are common types of equipment in the manufacturing industry. In addition, the light guides produced by the present process, have a good optical performance due to a uniform thickness of the base sheet.

Figure 3:
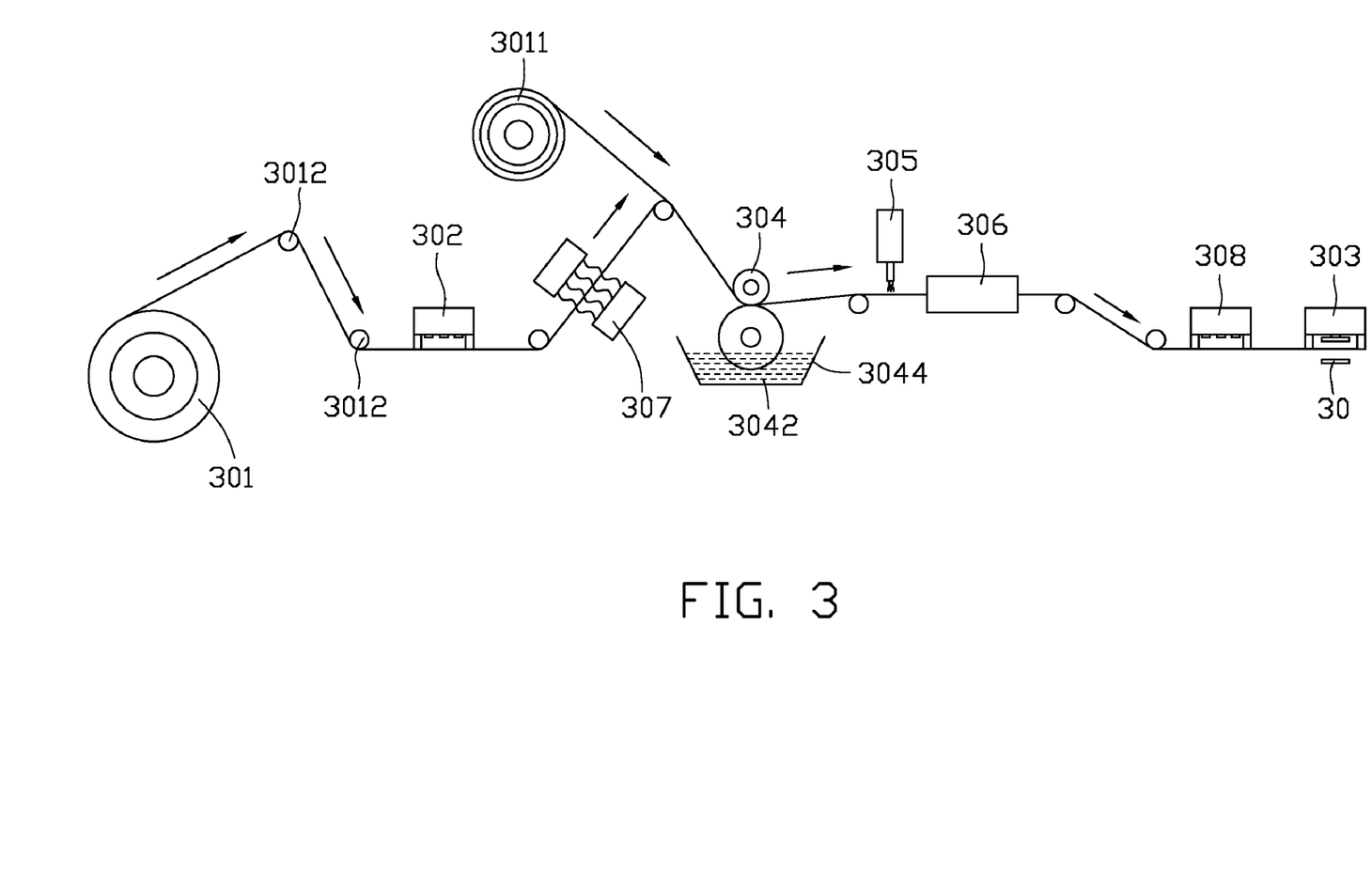
FIG. 3 is a diagram of a process for making a light guide according to a second preferred embodiment of the present invention.

FIG. 3 is a schematic chart of a process for making a light guide 30 according to a second preferred embodiment. The process mainly includes the following six steps.

Step one: a continuous transparent base sheet 301 is provided. The base sheet 301 is similar in principle to the base sheet 201 as described in the first embodiment. The base sheet 301 can be continuously fed to a punching machine 302 by a number of rolling devices 3012.

Step two: at the punching machine 302 the base sheet 301 undergoes a punching process thereby yielding a punched sheet. In the punching process, the base sheet 301 is punched by the punching machine 302 to form an array of first apertures therein according to a predetermined pattern. The shape of each of first apertures is preferably either a round hole or a polygonal hole. In this embodiment, each first aperture is a conical frustum hole, and an inner surface of each of apertures is slanted to an extending direction of the base sheet 301.

Step three: a melted resin material 3042 is coated on the first apertures, and fills the first apertures. Before the coating process, a supporting layer 3011 is continuously sent to be affixed on one surface of the base sheet 301, such that one end of the apertures of the base sheet 301 is closed, and the melted resin material 3042 is received in the apertures. The supporting layer 3011 is made of any resin materials. The base sheet 301 with the supporting layer 3011 is fed to a roller coating device 304 for coating the melted resin material 3042 in the apertures of the base sheet 301. Referring to FIG. 3, the melted resin material 3042 is placed in a container 3044 of the roller coating device 304. In an exemplary embodiment, the melted resin material 3042 can be coated into the first apertures by spraying instead of roller coating.

The resin material 3042 can be selected from any of suitable resins known in the art. A light refractive ratio of the resins is larger than that of the base sheet 301. In this embodiment, the resin material 3042 includes a transparent matrix resin, and a plurality of light diffusion particles dispersed in the transparent matrix resin. The transparent matrix resin is selected from the group consisting of polyacrylic acid, polyethylene, and any combination thereof. The light diffusion particles can be particles made of material selected from the group consisting of titanium dioxide, silicon dioxide, and any combination thereof. An average diameter of the light diffusion particles is in the range from about 0.1 microns to about 10 microns, and preferably in the range from about 0.1 microns to about 1 micron.

In order to attain a good adhesive capability between the base sheet 301 and the supporting layer 3011, the base sheet 301 can be corona treated by a corona treating device 307 before the supporting layer 3011 is affixed to the base sheet 301.

Step four: the melted resin material is solidified to form a plurality of resin blocks in the first apertures. The resin material can be solidified by either a thermal solidifying method or a UV-light (ultraviolet-light) solidifying method. In this embodiment, the base sheet 301 coated with the light diffusion material is sent to a thermal-curing device 306 for being solidified continuously.

Before the melted resin material is solidified, a light diffusion solution can be sprayed on the melted resin material by a spraying device 305. The light diffusion solution includes a plurality of nano-particles dispersed in an organic solution. This spraying step is performed for further improving the light diffusion capability of the light guides 30.

Step five: the base sheet 301 is continuously sent to be punched by a punching machine 308 to form an array of second apertures in the resin blocks, the second apertures configured for illuminating the keys via at least one light source. The punching machine 308 is similar to the punching machine 302, except that the punching machine 308 uses a different cutter. A diameter of the cutter of the punching machine 308 is smaller than that of the punching machine 308. A structure of the cutter of the punching machine 308 is similar to the cutter 2021 as described in the first embodiment, such that a slanted inner surface of each second aperture of the base sheet 301 can be obtained.

Step six: the base sheet 301 with the second apertures are trimmed into a light guide 30 by a die cut machine 303 according to a predetermined pattern. This step six is similar in principle to step three as described above in relation to the first embodiment.

It is very convenient and cost-efficient to mass-produce the light guides employing the present process, because the punching machine 302 and die cut machine 303 are ordinary types of equipment in the manufacturing industry. In addition, the light guides produced by the present process have good optical performance due to an employment of uniform thickness of the base sheet. Furthermore, light rays emitted by an external light source (not shown) enter the base plate 301, and the light rays transmit to the resin layer. Most of light rays are reflected back at an outer surface of the resin layer toward a boundary between the base sheet 301 and the resin layer. Many or most of the light rays undergo total reflection at the boundary between the base sheet 301 and the resin layer are reflected back into the resin layer due to the light refractive rate is larger than that of the base sheet 301. Light rays are substantially diffused at the light diffusion particles in the resin layer. Finally, all light rays exit the resin layer through the inner surface of each aperture. Therefore, a ratio of utilization of light energy of the portable electronic device using the light guide 30 is increased.

It is should be pointed out that, before step six, an electrical insulation layer may be affixed on the supporting layer of the light guide 30, so as to cover the whole surface of the base sheet. One or more electrically conductive dopes may be sprayed/printed on portions of the electrical insulation layer corresponding to each aperture to form a plurality of electrically conductive layers.

Reference will now be made to the drawings to describe preferred embodiments of the present light guide manufactured by the processes as described above, in detail.

Figure 4:
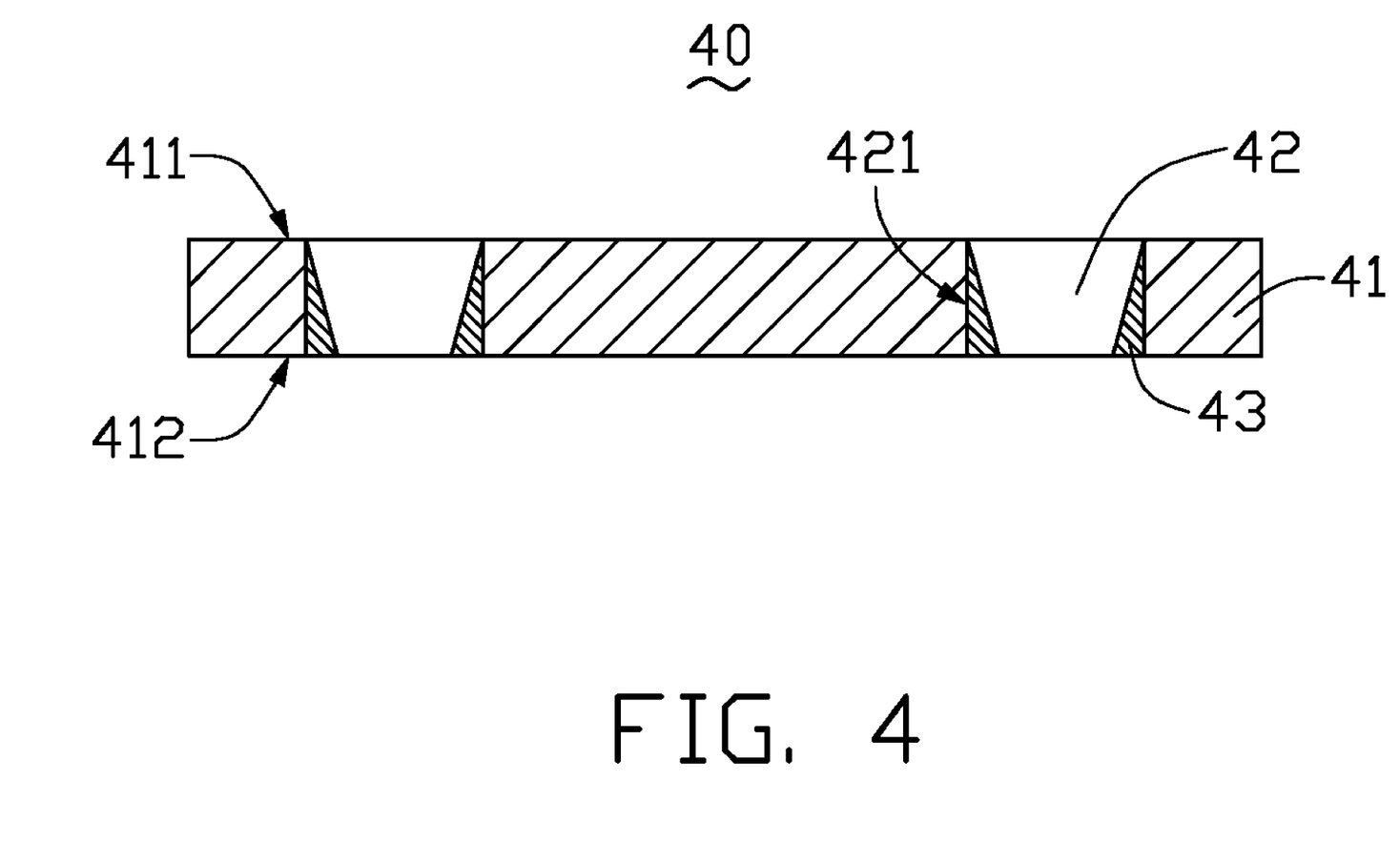
FIG. 4 is a side cross-sectional view of a light guide according to a third preferred embodiment of the present invention.

Referring FIG. 4, a light guide 40 for illuminating keys of a keyboard or keypad of a portable electronic device according to a third embodiment is shown. The light guide 40 includes a base sheet 41. The base sheet 41 defines an array of apertures, and an inner surface 421 of each of the apertures is coated with a resin layer 43. A bottom surface 412 and a top surface 411 are defined on opposite sides of the base sheet 41, and the apertures 42 communicate between the bottom surface 412 and the top surface 411. A thickness of the resin layer 43 progressively increases from the top surface 411 to the bottom surface 412. A light refractive ratio of the resin layer 43 is larger than that of the base sheet 41.

In this embodiment, the light diffusion layer 43 includes a transparent matrix resin, and a plurality of light diffusion particles uniformly dispersed in the transparent matrix resin. The transparent matrix resin can be selected from the group consisting of polyacrylic acid, polyethylene, and any combination thereof. The light diffusion particles can be particles made of material selected from the group consisting of titanium dioxide, silicon dioxide, and any combination thereof. An average diameter of the light diffusion particles is in the range from about 0.1 microns to about 10 microns, and preferably in the range from about 0.1 microns to about 1 micron.

Light rays emitted by an external light source (not shown) enter the base plate 41, and travels to the resin layer 43. Most of the light rays are reflected back by an outer surface of the resin layer 43 toward a boundary between the base sheet 41 and the resin layer. Because a light refractive index of the resin layer 43 is larger than a light refractive index of the base sheet 41, many or most of the light rays undergo total reflection at a boundary between the base sheet 41 and the resin layer 43 and are reflected back into the resin layer 43. Light rays are substantially diffused by the light diffusion particles in the resin layer. Finally, all light rays exit the resin layer 43 through the inner surface of each aperture 42. Therefore, a ratio of utilization of light energy of the portable electronic device using the light guide 40 is increased.

Figure 5:
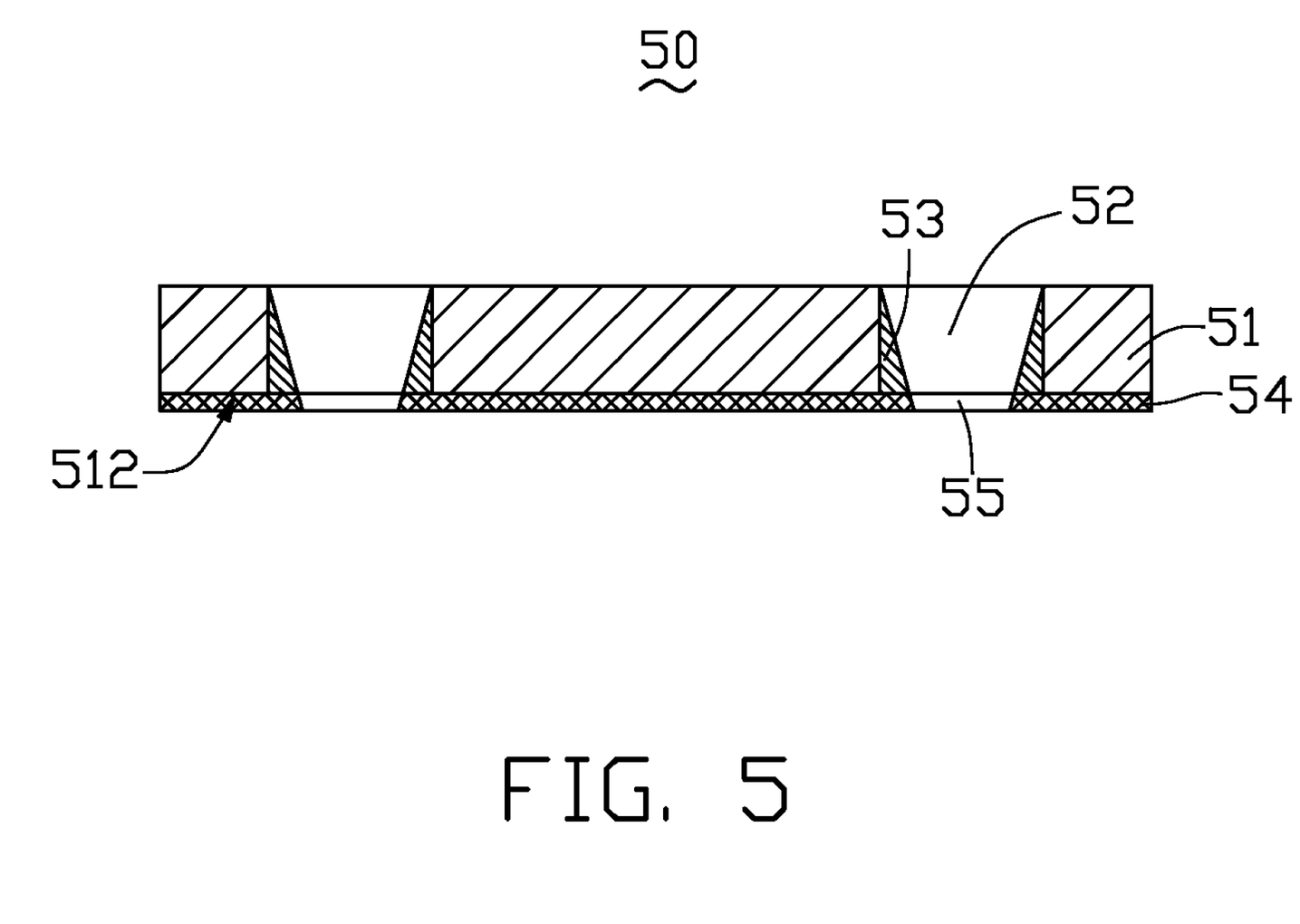
FIG. 5 a side cross-sectional view of a light guide according to a fourth preferred embodiment of the present invention.

Referring FIG. 5, a light guide 50 in accordance with a fourth preferred embodiment is shown. The light guide 50 includes a base sheet 51, an array of apertures 52, and a light diffusion layer 53. The light guide 50 is similar in principle to the light guide 40 of the third embodiment, except that the light guide 50 further includes a supporting layer 54 coated on a bottom surface 512 of the base sheet 51 for supporting the light diffusion layer 53. The supporting layer 54 improves a mechanical stability of the light guide 50. The supporting layer 54 defines a plurality of through holes 55 communicating with the apertures 52 of the light guide 50 correspondingly.

Figure 6:
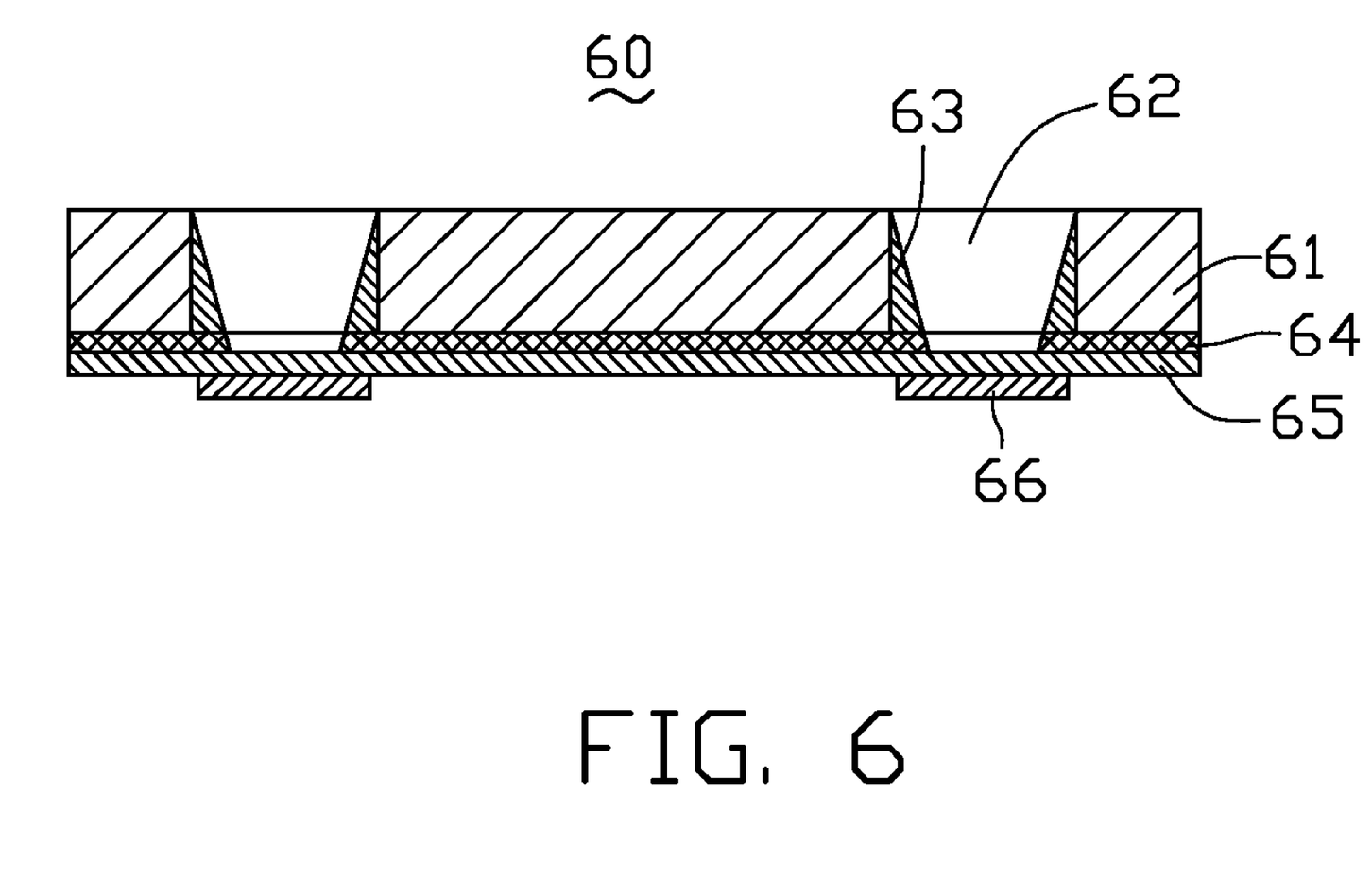
FIG. 6 is a side cross-sectional view of a light guide according to a fifth preferred embodiment of the present invention.

Referring FIG. 6, a light guide 60 in accordance with a fifth preferred embodiment is shown. The light guide 60 includes a base sheet 61, an array of apertures 62, a light diffusion layer 63, and a supporting layer 64. The light guide 60 is similar in principle to the light guide 50 of the fourth embodiment, except that the light guide 60 further includes an electrical insulation layer 65 coated on the light diffusion layer 64. In addition, the light guide 60 further includes a plurality of electrically conductive layers 66 affixed on the electrical insulation layer 65 corresponding to the apertures 62. In this embodiment, the light guide 60 may replace an electrical insulation layer and a light guide that are ordinarily used in a backlight module. Because the single light guide 60 can be used in place of both an electrical insulation layer and a light guide, the cost of the portable electronic device is also reduced.

Finally, while particular embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A light guide for illuminating keys of a keyboard or keypad of a portable electronic device, the light guide comprising:
   a base sheet;
   an array of apertures defined in the base sheet and corresponding to the keys of the portable electronic device, and being configured to allow the keys of the portable electronic device to be illuminated by at least one light source; and
   a resin layer formed on an inner surface of each aperture.

2. The light guide according to claim 1, wherein a light refractive ratio of the resin layer is larger than that of the base sheet.

3. The light guide according to claim 1, wherein the resin layer comprises a transparent matrix resin, and a plurality of light diffusion particles dispersed in the transparent matrix resin.

4. The light guide according to claim 3, wherein an average diameter of the light diffusion particles is in the range from about 0.1 microns to about 10 microns.

5. The light guide according to claim 3, wherein the light diffusion particles are made of material selected from the group consisting of silicon diode particles and titanium dioxide particles.

6. The light guide according to claim 1, wherein the base sheet comprises a bottom surface and a top surface opposite to the bottom surface, the apertures communicate between the bottom surface and the top surface, and a thickness of the light diffusion layer progressively increases from the top surface to the bottom surface.

7. The light guide according to claim 6, further comprising a supporting layer coated on the bottom surface of the base sheet, the supporting layer defining a plurality of through holes communicating with the apertures of the base sheet correspondingly.

8. The light guide according to claim 7, further comprising an electrical insulating layer coated on the supporting layer, and a plurality of electrically conductive layers affixed on the electrical insulation layer corresponding to the apertures.

\* \* \* \* \*